No. 752,717. PATENTED FEB. 23, 1904.
J. B. SMITH.
NAVIGATOR'S POSITION INDICATOR.
APPLICATION FILED AUG. 28, 1903.
NO MODEL. 2 SHEETS—SHEET 1.
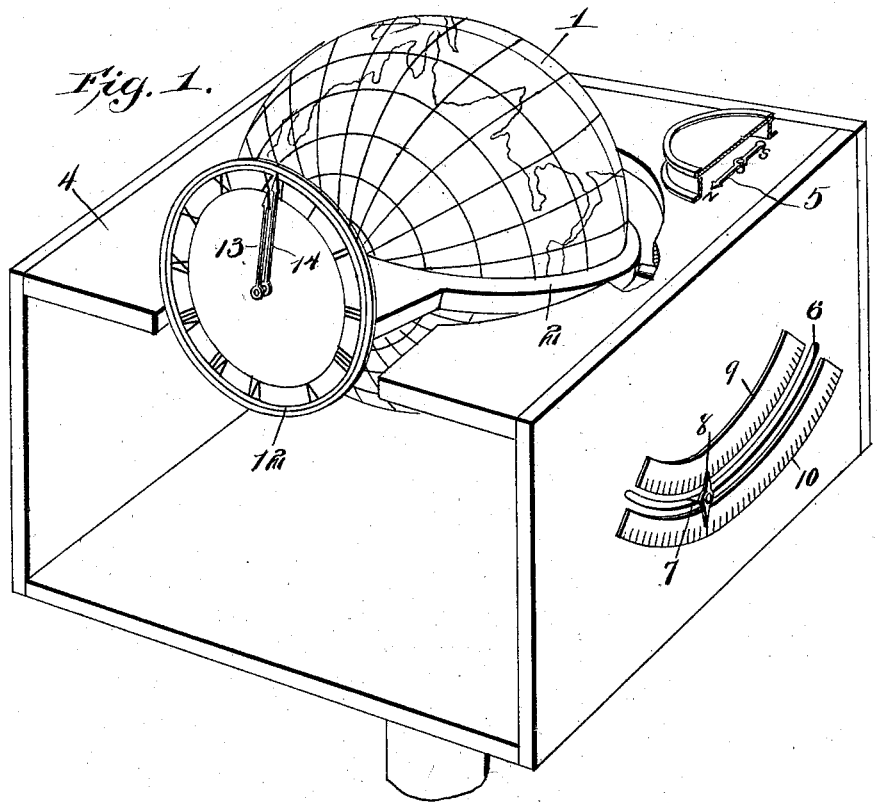
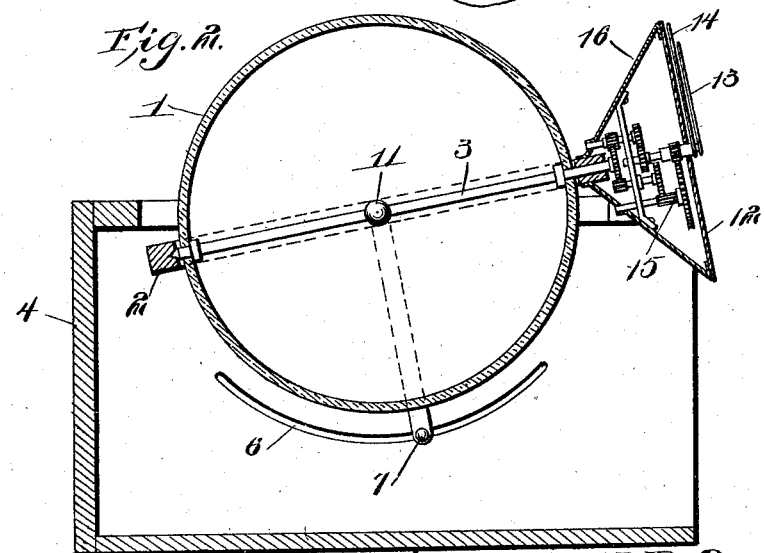
Witnesses
J. B. Smith, Inventor.
by
Attorneys No. 752,717. PATENTED FEB. 23, 1904.
J. B. SMITH.
NAVIGATOR'S POSITION INDICATOR.
APPLICATION FILED AUG. 28, 1903.
NO MODEL. 2 SHEETS—SHEET 2.
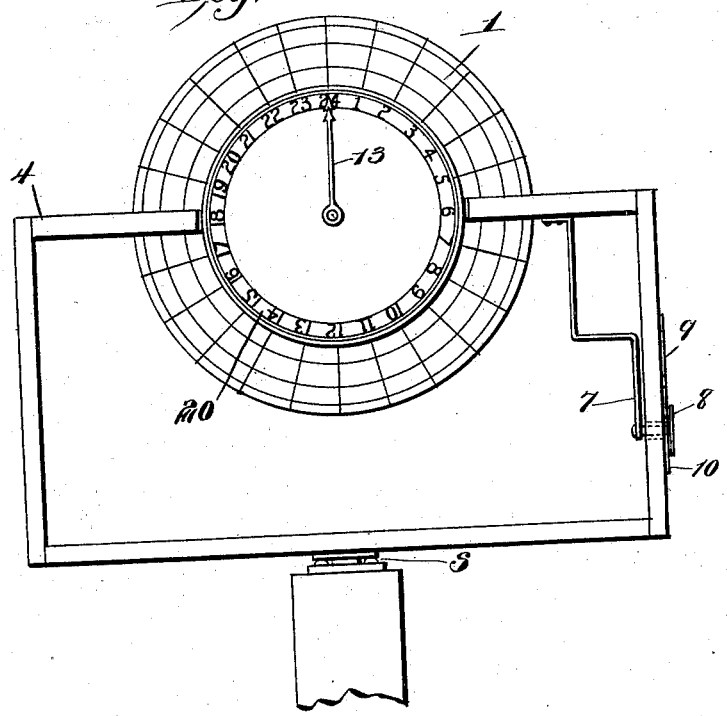
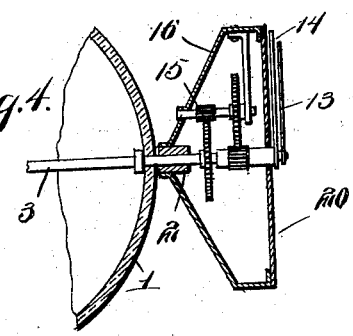
Witnesses
Inventor,
J. B. Smith,
by
Attorneys No. 752,717. Patented February 23, 1904.

UNITED STATES PATENT OFFICE.

JOHN B. SMITH, OF VALDOSTA, GEORGIA.

NAVIGATOR'S POSITION-INDICATOR.

SPECIFICATION forming part of Letters Patent No. 752,717, dated February 23, 1904.

Application filed August 28, 1903. Serial No. 171,148. (No model.)

*To all whom it may concern:*

Be it known that I, JOHN B. SMITH, a citizen of the United States, residing at Valdosta, in the county of Lowndes and State of Georgia, have invented a new and useful Navigator's Position-Indicator, of which the following is a specification.

This invention relates to navigators' position-indicators; and the object of the invention is to provide an instrument whereby a navigator may by mechanically adjusting the instrument and exposing it when properly adjusted to the sun determine his position at sea without the ordinary calculations necessary to determine position at sea from an observation of the sun's altitude.

A further object of the invention is to provide an instrument of the character specified which will be of extremely simple construction, so that it may be adjusted with ease and rapidity, and which will indicate the position of a vessel with certainty at any time and in any portion of the world if the sun is visible toward the middle of the day and the meridian time be known.

With the objects above mentioned and others in view the invention consists in the construction and combination of parts of the navigator's position-indicator hereinafter described, illustrated in the accompanying drawings, and having the novel features thereof particularly pointed out in the appended claims.

In the drawings, Figure 1 is a perspective view of the invention, showing the parts set in position to indicate the location of a vessel on the prime meridian. Fig. 2 is a vertical section in the plane of the axis of the globe. Fig. 3 is a view in front elevation, showing a modified form of dial. Fig. 4 is a detail view in section, showing the form of gearing employed in operating the hands in the modified form of the invention.

Referring to the drawings, in which corresponding parts are designated by the same characters of reference, 1 designates a globe, which will preferably be formed of glass in order to secure perfect transparency and which will bear lines representing the meridians of longitude and the parallels of latitude. The globe may, if desired, have marked thereon also the outlines of the continents. The globe 1 is rotatable within a circular frame 2 and is mounted upon an axis 3, which is rotatably mounted in the frame and turns with the globe. The axis 3 corresponds in position to the earth, and the frame 2 is pivoted at opposite points adjacent to the equatorial circle on the globe. The globe is thus supported, as it were, in gimbals and may be set so as to bring any point on the globe uppermost.

The frame 2 is mounted in the top of the casing or box 4, which will be pivotally supported upon a vertical axis afforded by a suitable standard, which may be of any preferred form, as that shown at S. On top of the box 4 will be provided a small compass 5, by which the direction of the axis 3 of the globe may be adjusted to point directly north and south. On the side of the box or casing 2 will be provided a slot 6, cut on a circular arc, as shown, and having extending therethrough an arm 7, which is rigidly attached to the frame 2 and is provided on the end which extends through the slot with a pointer 8, whose ends move over scales 9 and 10 of segmental form, which are disposed adjacent to the slot 6, on opposite sides thereof. The scales 9 and 10 are graduated to indicate the position of the sun relative to the celestial equator on every day in the year, and by setting the pointer 8 in proper position, as indicated by the scale, for the day upon which it is set the frame 2, in which the globe is mounted, will be brought into such position that the equatorial circle of the globe 1 will make such an angle with the equatorial circle of the earth as will correspond in magnitude to latitude of the vessel at the time the indicator is set.

Within the globe 1, upon the axis thereof, there is mounted a small bulb 11, of opaque material, which is fixed as accurately as possible at the center of the globe, and upon the front of the circular frame 2 will be mounted a clock-dial 12, over which will move hands 13 and 14 of the usual type employed in timepieces to indicate the hours and minutes, respectively. In the preferred form of the invention the hands 13 and 14 will be so connected by gearing (indicated generally as 15 and inclosed with a casing 16) that one rotation of the axis of the globe will cause two revolutions of the hour-hand 13 and twenty-four revolutions of the minute-hand 14.

In an instrument constructed in the manner described it will be readily seen that if the indicator 8 is set at the proper point relative to the scales 9 and 10 to correspond to any day upon which it is desired to determine the geographical position of a vessel and the hands before the dial be set at the proper point to indicate meridian time at the moment the observation is made and the axis 3 of the globe be brought into true north and south position, as indicated by the compass, the shadow cast by the bulb 11 will fall upon the point on the globe corresponding to the position of the vessel at that time.

As various meridians are used as a basis for meridian time, the instrument will be constructed to be used with chronometers set for different meridians, as those of Washington, Paris, and Greenwich. When the apparatus is to be used with a chronometer set for Washington time, the hands will obviously be arranged so that when the hour-hand is set for noon the meridian of Washington will be lowermost and the meridian one hundred and eighty degrees removed from Washington be uppermost. When the instrument is to be used with a chronometer set for the time on any other meridian, the hands will be similarly arranged.

In Fig. 3 there is illustrated a modified form of the invention in which a dial 20 is used, and instead of the ordinary twelve divisions the dial is provided with twenty-four divisions, so that the hands to indicate properly the hour of the day should make but a single revolution in twenty-four hours. With the form of dials shown at 20 the hour-hand will be directly connected with the axis of the globe, as shown in Fig. 4, and gearing will be used only to impart movement to the minute-hand at the rate of twenty-four revolutions for each revolution of the hour-hand. As the mode of using the modified form of the invention is precisely the same as that of using the preferred form, no special description thereof is regarded as necessary.

From the foregoing description of the construction and mode of operation of my invention it will be readily seen that when the meridian time is known and the sun is visible at sufficient elevation above the horizon for the ordinary form of solar observation the position of a vessel at sea may be determined accurately and quickly by purely mechanical means without the necessity of making any of the usual calculations based upon observations with a sextant or other solar altitude instrument. It will also be readily seen that the ease of setting the parts of the mechanism to secure the satisfactory observation is greater than in making observations with the ordinary form of instrument, and the results of the observations are obtained in tangible form at once.

Having thus described the construction and operation of my invention, what I claim as new, and desire to secure by Letters Patent, is—

1. The combination of a terrestrial globe mounted for adjustment to position corresponding to the relative position of earth and sun, and an opaque body disposed in proper position relative to the globe for casting a shadow thereon to indicate the location of the instrument at the time the observation is made.

2. The combination in an instrument of the class described, of a transparent terrestrial globe supported for adjustment to any desired position and an opaque body at the center of the globe.

3. The combination in a device of the class described, of a hollow terrestrial globe of glass mounted for adjustment to any desired position, and an opaque bulb at the center thereof.

4. The combination in a device of the class described, of a transparent terrestrial globe, gimbals in which said globe is supported for adjustment into any desired position, and an opaque body supported at the center of the globe.

5. The combination in a device of the class described, of a transparent terrestrial globe mounted for adjustment to any desired position, an opaque body supported at the center of the globe, a clock-dial, hands mounted in front of the said dial, gearing connected with said hands and said globe, whereby the movement of the globe on its axis will impart movement to the hands at a rate proportionate to the normal relation of changes in longitude to changes in time.

6. The combination in a device of the class described, of a casing, a transparent globe mounted in said casing for adjustment to any desired position, a support for said casing upon which it is rotatable, a compass fixed on the casing in position to show when the axis of the globe is in the meridian, and an opaque body at the center of the globe.

7. The combination in a device of the class described, of a casing, gimbals associated with said casing, a transparent globe mounted in the gimbals, an opaque body mounted at the center of said globe, a scale on said casing to indicate the relative positions of the earth and sun at any time, and an arm bearing an indicator attached to the gimbals and movable over said scale.

In testimony that I claim the foregoing as my own I have hereto affixed my signature in the presence of two witnesses.

JOHN B. SMITH.

Witnesses:
  Roy E. Knight,
  J. H. Duffy.